United States Patent Office 3,838,167
Patented Sept. 24, 1974

3,838,167
PROCESS FOR PREPARING INDOLES
Charles D. Jones, Indianapolis, Ind., assignor to Eli Lilly and Company, Indianapolis, Ind.
No Drawing. Filed Aug. 1, 1972, Ser. No. 277,018
Int. Cl. C07d 27/56
U.S. Cl. 260—326.16
8 Claims

ABSTRACT OF THE DISCLOSURE

An indole is produced by reacting an N-sulfonylated o-aminophenyl carbonyl compound, specifically an N-sulfonylated o-aminophenyl ketone or an N-sulfonylated o-aminobenzaldehyde, with an α-haloketone or an α-haloester to produce an N,N-disubstituted sulfonamide, ring-closing and dehydrating the resulting N,N-disubstituted sulfonamide to produce an N-sulfonyl indole, and cleaving the N-sulfonyl group from the N-sulfonyl indole to obtain a 1-unsubstituted indole product.

BACKGROUND OF THE INVENTION

This invention relates to a process for the preparation of indoles. In U. S. Pat. No. 3,660,430, 3-arylindoles containing a defined functional group in the 2-position are prepared by alkylation of a 2-aminobenzophenone followed by cyclization to the 2-substituted 3-arylindole. It has now been found to be possible to prepare these as well as other indoles by a process which additionally affords in general higher product yields.

SUMMARY OF THE INVENTION

This invention relates to a process for the preparation of an indole of the formula

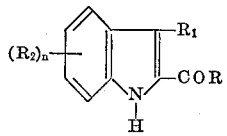

which comprises reacting an N-sulfonylated o-aminopheny carbonyl compound of the formula

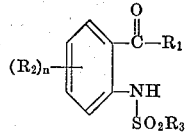

with at least an equimolar quantity of an α-halo compound of the formula

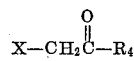

under substantially anhydrous conditions and in the presence of at least an equimolar amount of an alkaline reagent based upon the N-sulfonylated o-aminophenyl carbonyl compound to produce an N,N-disubstituted sulfonamide of the formula

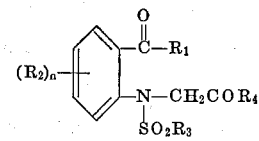

ring-closing and dehydrating the N,N-disubstituted sulfonamide to produce an N-sulfonyl indole of the formula

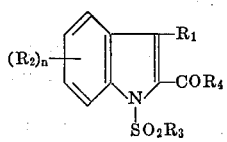

and cleaving the sulfonyl group to produce the aforementioned indole, in which, in the above formulae, X is chlorine or bromine;
$n$ is zero, 1 or 2;
$R_1$ is hydrogen, lower alkyl, phenyl, halophenyl, nitrophenyl, lower alkylphenyl, or lower alkoxyphenyl;
each $R_2$ independently is halogen, lower alkyl, lower alkoxy, nitro, or trifluoromethyl;
$R_3$ is lower alkyl, phenyl, or lower alkylphenyl;
$R_4$ is lower alkyl, phenyl, halophenyl, nitrophenyl, lower alkylphenyl, lower alkoxyphenyl, lower alkoxy, or phenoxy; and
R is lower alkyl, phenyl, halophenyl, nitrophenyl, lower alkylphenyl, lower alkoxyphenyl, or hydroxyl.

DETAILED DESCRIPTION OF THE INVENTION

A similar sequence to that defined herein was reported by workers in Yugoslavia in M. Oklobdzija, M. Japelj and T. Fajdiga, *J. Heterocycl. Chem.*, 9, 161 (1972).

In the process of this invention, a three-step conversion sequence is involved. First, an N-sulfonylated o-aminophenyl carbonyl compound, specifically, an N-sulfonylated o-aminophenyl ketone or an N-sulfonylated o-aminobenzaldehyde, is N-alkylated using an α-haloketone or an α-haloester. Secondly, the resulting N,N-disubstituted sulfonamide is ring-closed and dehydrated to produce an N-sulfonyl indole. Thirdly, the N-sulfonyl indole is cleaved to produce a 1-unsubstituted indole product.

An N-sulfonylated o-aminophenyl carbonyl compound is employed as starting material in the process of this invention. Such compounds are readily available in accordance with known procedures by reacting the corresponding o-aminophenyl ketone or aldehyde with the desired sulfonyl chloride. Both the sulfonyl chloride and the o-aminophenyl carbonyl compound either are available commerically or are readily prepared by employing recognized procedures.

With respect particularly to the first step of the process of this invention, the N-sulfonylated o-aminophenyl carbonyl compound is treated with the α-haloketone or α-haloester to achieve N-alkylation. The N-alkylation is achieved under substantially anhydrous conditions and typically is carried out in an inert solvent and an alkaline medium. The temperature of reaction generally ranges from about —10° C. to about +75° C. Preferably, the temperature is from about 0° C. to about 50° C., and, more preferably, from about 0° C. to about ambient room temperature.

Suitable inert solvents are those which readily accommodate the reactants from the standpoint of solubility and which are amenable to use at the particular temperatures or temperatures at which the reaction is carried out. Such solvents include, for example, aromatic hydrocarbons such as toluene and xylene; halogenated hydrocarbons such as carbon tetrachloride, chlorobenzene, chloroform, bromoform, bromobenzene, 1,2-dichloroethane, 1,2-dibromoethane, and the like; amides, such as N,N-dimethylformamide, N,N-dimethylacetamide, and the like; aliphatic nitriles, such as acetonitrile, propionitrile, and the like; esters, such as ethyl acetate, and the like; ethers, such as ethyl ether, dioxane, and the like; and any other appropriate inert solvents.

The alkylation reaction is conducted in the presence of an alkaline reagent. Preferred reagents include alkoxides and hydrides of alkali metals, for example, sodium methoxide, sodium hydride, potassium ethoxide, potassium hydride, lithium propoxide, lithium hydride, and the like. The alkaline reagent which is employed is present in an amount at least equimolar to the N-sulfonylated o-aminophenyl carbonyl compound. Preferably, about 1.0 to about 1.2 moles of the alkaline reagent are employed per mole of the o-aminophenyl carbonyl compound.

The N-sulfonylated o-aminophenyl carbonyl compound has the formula

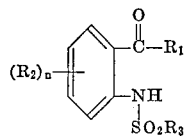

Typical R₁ substituents include, for example, hydrogen, lower alkyl, phenyl, chlorophenyl, bromophenyl, fluorophenyl, iodophenyl, nitrophenyl, tolyl, ethylphenyl, isopropylphenyl, methoxyphenyl, ethoxyphenyl, and the like. "Lower alkyl" when used herein refers to a $C_1$–$C_4$ alkyl, and includes, methyl, ethyl, n-propyl, isopropyl, n-butyl, sec-butyl, isobutyl, and t-butyl. "Lower alkoxy" when used herein refers to a $C_1$–$C_4$ alkoxy group, and includes, methoxy, ethoxy, n-propoxy, isopropoxy, n-butoxy, sec-butoxy, isobutoxy, and t-butoxy.

The R₂ substituent is illustrated by hydrogen, fluorine, chlorine, bromine, iodine, lower alkyl (as hereinabove defined), methoxy, isopropoxy, butyloxy, nitro, trifluoromethyl, and the like.

The R₃ substituent can be typified by lower alkyl as defined hereinabove, and preferably methyl, as well as an aryl substituent such as phenyl, tolyl, ethylphenyl, cumyl, and the like. Preferably, R₃ will be methyl or p-tolyl.

Illustrative of the N-sulfonylated o-aminophenyl carbonyl compounds which can be employed as starting materials in the process of this invention are the following:

N-(p-toluenesulfonyl)-2-aminobenzaldehyde;
N-(benzenesulfonyl)-2-amino-4-chlorobenzophenone;
N-(methanesulfonyl)-2-amino-3-nitroacetophenone;
N-(p-toluenesulfonyl)-2-amino-5-methoxy-4'-chlorobenzophenone;
N-(methanesulfonyl)-2-amino-4-trifluoromethyl-3'-methoxybenzophenone;
N-(p-cumenesulfonyl)-2-amino-5-methyl-2'-nitrobenzophenone;
N-(p-toluenesulfonyl)-2-amino-4'-ethylbenzophenone;
N-(benzenesulfonyl)-2-amino-4,5-dibromobenzaldehyde;
N-(methanesulfonyl)-2-amino-4-chloro-6-methylpropiophenone;
N-(p-toluenesulfonyl)-2-amino-3-trifluoromethyl-5-methoxybenzophenone;

and the like.

The N-sulfonylated o-aminophenyl carbonyl compound is alkylated using an α-haloketone or α-haloester having the formula

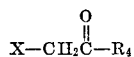

in which the X substituent is chlorine or bromine, and R₄ is typified by lower alkyl (as hereinabove defined), phenyl, chlorophenyl, bromophenyl, nitrophenyl, tolyl, ethylphenyl, cumyl, methoxyphenyl, butyloxyphenyl, methoxy, ethoxy, t-butyloxy, phenoxy, and the like.

At least an equimolar quantity of the α-halo compound is employed per mole of the N-sulfonylated o-aminophenyl carbonyl compound. Preferably, a slight excess, for example, from about 1.1 to about 1.5 moles of the α-halo compound per each mole of the o-amino compound is employed, although a larger molar excess, for example, up to about 3:1 or more can be employed.

The product produced by the above described first step is an N,N-disubstituted sulfonamide and has the formula

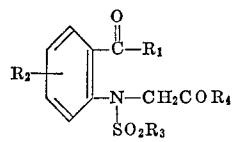

In the above N,N-disubstituted sulfonamide, R₁, R₂, R₃ and R₄ represent any of the substituents delineated hereinabove with respect to each of them.

Illustrative of the N,N-disubstituted sulfonamides are the following:

N-(p-toluenesulfonyl)-N-phenoxycarbonylmethyl-2-aminobenzaldehyde;
N-benzenesulfonyl-N-benzoylmethyl-2-amino-6-bromoacetophenone;
N-methanesulfonyl-N-acetylmethyl-2-amino-3-iodo-4'-methylbenzophenone;
N-(p-ethylbenzenesulfonyl)-N-(p-bromobenzoylmethyl)-2-aminobenzophenone;
N-ethanesulfonyl-N-(3-nitrobenzoylmethyl)-2-amino-4-t-butyloxy-4'-isopropylbenzophenone;
N-(p-toluenesulfonyl)-N-ethoxycarbonylmethyl-2-amino-3'-t-butyloxybenzophenone;
N-(p-toluenesulfonyl)-N-ethoxycarbonylmethyl-2-amino-4,5-dichlorobenzophenone;
N-benzenesulfonyl-N-(3-methoxybenzoylmethyl)-2-amino-3,5-dimethoxy-4'-chlorobenzophenone;
N-methanesulfonyl-N-propionylmethyl-2-amino-4-trifluoromethyl-6-nitropropiophenone;

and the like.

The product produced by the above-described first step, an N,N-disubstituted sulfonamide, is then ring-closed and dehydrated to produce an N-sulfonyl indole having the formula

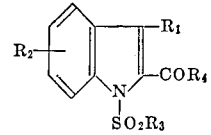

In the above N-sulfonyl indole, R₁, R₂, R₃ and R₄ represent any of the substituents as delineated hereinabove with respect to each of them.

The ring-closure preferably is carried out in an alkaline medium and is followed by dehydration of the resulting carbinol intermediate to form the desired N-sulfonyl indole.

Only a catalytic quantity of the alkaline reagent is required to achieve ring-closure of the N,N-disubstituted sulfonamide; however, up to a molar equivalent or more of the reagent can be employed. Typically, from about 0.05 to about 1.5 moles of the alkaline reagent are employed per mole of the N,N-disubstituted sulfonamide.

The alkaline reagent preferably is an alkali metal alkoxide, such as sodium methoxide, sodium ethoxide, potassium t-butoxide, potassium methoxide, lithium methoxide, and the like. The alkaline reagent can also be a hydride such as sodium hydride, potassium hydride, and the like, and, if such is employed, preferably an alcohol such as methanol, ethanol, and the like, also will be used.

The ring-closure typically is achieved by maintaining the sulfonamide and alkaline catalytic reagent in a suitable solvent at a temperature of from about 0° C. to about room temperature for a period of from about 15 minutes to about 4 hours.

The alkaline ring-closure step in effect achieves the formation of a labile carbinol intermediate which, upon dehydration, yields the N-sulfonyl indole. Any of several reagents recognized to be active in accomplishing the effective chemical elimination of water from a molecule can be suitably employed. These include, for example, thionyl chloride, phosphorus oxytrichloride, p-toluenesulfonic acid, methanesulfonic acid, and the like. In those instances in which the dehydration is accompanied by the formation of an acid as by-product, an acid scavenger will be employed.

For example, when thionyl chloride is employed to accomplish dehydration, hydrochloric acid is formed as byproduct, and an acid scavenger will thus be employed. However, when p-toluenesulfonic acid is employed as dehydrating agent, no acid by-product forms and thus no acid scavenger is used. Suitable such acid scavengers include tertiary amines such as triethylamine, pyridine, N-methylpiperidine, N-methylmorpholine, and the like.

At least a chemically equivalent quantity of the dehydrating agent based upon the carbinol intermediate is employed with at least a like quantity of the acid scavenger if such is required. An excess of either or both of these reagents can likewise be employed with no detrimental effect. Typically, from about 1 to about 2 moles of the dehydrating agent and the acid scavenger (if such is present) are employed per mole of the carbinol intermediate.

The dehydration reaction is quite rapid and generally is completed within about 1 hour. Typically, the time of reaction is from about 30 minutes to about 1 hour with the temperature of reaction being from about 0° C. to about 100° C. Preferably, the temperature of reaction is from about 0° C. to about room temperature, with the time of reaction being dependent upon the particular temperature which is selected.

Illustrative of the N-sulfonyl indoles produced by the process of this invention are the following:

1-(p-toluenesulfonyl)-2-benzoylindole;
1-benzenesulfonyl-2-methoxycarbonyl-3-phenyl-5-chloroindole;
1-methanesulfonyl-2-acetyl-3-methyl-4-methylindole;
1-ethanesulfonyl-2-(p-chlorobenzoyl)-3-(p-nitrophenyl)-6-methoxyindole;
1-(p-toluenesulfonyl)-2-(3-nitrobenzoyl)-3-(p-tolyl)-5-nitroindole;
1-(p-toluenesulfonyl)-2-phenoxycarbonyl-3-(3-ethoxyphenyl)-6-trifluoromethylindole;
1-methanesulfonyl-2-(2-methoxybenzoyl)-7-bromoindole;
1-propanesulfonyl-2-isopropoxycarbonyl-3-(2-bromophenyl)-5-ethoxy-7-trifluoromethylindole;
1-benzenesulfonyl-2-butanoyl-4-iodo-4-methylindole;
1-cumenesulfonyl-2-(t-butyloxycarbonyl)-3-ethyl-6-nitro-7-ethoxyindole;

and the like.

The final step of the process of this invention is directed to the cleavage of the N-sulfonyl group to produce the free indole. The cleavage preferably is carried out under alkaline conditions which include mixing in an appropriate solvent the N-sulfonyl indole with an alkaline reagent. The alkaline reagent can include, for example, an alkali metal hydroxide, an alkali metal alkoxide, or an alkali metal hydride. Preferably, an alkali metal alkoxide is employed. An alkali metal hydroxide can be employed with relative success except that it has been found to be preferable to avoid its use in those instances in which $R_1$ in the defined N-sulfonyl indole is hydrogen. Preferably, if an alkali metal hydride is employed, the solvent which is used will be an alcohol, such as methanol or ethanol.

Since the reaction is one of cleavage of the N-sulfonyl group to obtain the free indole, the conditons under which such is accomplished are not critical and need be only severe enough in terms of time, temperature and alkaline medium to achieve the intended cleavage. Thus, the time of reaction is not critical. It can range very broadly and generally can extend anywhere from about 30 minutes to about 20 hours or more.

Furthermore, the temperature can vary within a broad range and need only be high enough to accomplish the cleavage. Typically, the cleavage temperature will be from about 50° C. to about 100° C.

The quantity of alkaline reagent which is employed in the cleavage reaction depends directly upon the quantity and structure of the N-sulfonyl indole. At least an equimolar quantity of the alkaline reagent is employed, and, typically, a slight excess is employed.

The ultimate product which is obtained from the cleavage reaction depends upon the substituent which is in the 2-position of the N-sulfonyl indole. In the instance in which $R_4$ in the N-sulfonyl indole is alkyl, phenyl, or substituted phenyl, the indole product will be a 2-acyl indole and will correspond to the N-sulfonyl indole in all respects with the exception of the replacement of the sulfonyl group by a hydrogen. In the instance in which $R_4$ is alkoxy or phenoxy, saponification will occur along with the cleavage, and the product will be the corresponding indole-2-carboxylic acid. In the latter instance, sufficient alkaline reagent should be employed to ensure both cleavage and saponification of the N-sulfonyl indole starting material, and thus at least two equivalents of the alkaline reagent should be employed per mole of the N-sulfonyl indole.

Typical indole products which are available from appropriate starting materials applied to the process of this invention are the following:

indole-2-carboxylic acid;
3-methyl-5-chloroindole-2-carboxylic acid;
3-phenyl-4-methylindole-2-carboxylic acid;
2-acetyl-3-(p-chlorophenyl)-6-bromoindole;
2-benzoyl-3-ethylindole;
2-(3-bromobenzoyl)-7-trifluoromethylindole;
2-(4-nitrobenzoyl-3-(4-tolyl)-5-nitroindole;
2-(3-methylbenzoyl)-3-(3-ethoxyphenyl)indole;
2-(2-methoxybenzoyl)-7-iodoindole;
5-fluoroindole-2-carboxylic acid;
2-(2-chlorobenzoyl)-3-(4-cumyl)-6-isopropylindole;
2-benzoyl-5-t-butylindole;
2-(4-isopropoxybenzoyl)-3-n-butyl-5,6-dichloroindole;
5,6-dichloroindole-2-carboxylic acid;
2-propionyl-3-(3-iodophenyl)-4-trifluoromethyl-6-methylindole;
2-benzoyl-3-methyl-5,6-dimethoxyindole;
2-(4-isopropylbenzoyl)-3-(3-isopropoxyphenyl)-6-ethyl-7-nitroindole;
2-(2-iodobenzoyl)-3-butyl-5-ethoxy-7-bromoindole;

and the like.

The indoles produced by the process of this invention are useful as central nervous system depressants such as are described in U.S. Pat. 3,660,430.

Furthermore, the thus-produced indoles absorb ultraviolet light and are useful as sun-screening materials in salves and ointments. In addition, because of their solubility in organic materials generally, they can be used as ultraviolet absorbers in plastics and resins, such as polystyrene, polyethylene, polypropylene, polyacrylics (methacrylate resins, polyacylamides, polyacrylonitrile fibers), polyamide fibers, for example, nylon, and polyester fibers. In the latter use, the inclusion of about 0.01 to 5% of the absorber, based upon polymer weight, is sufficient to render protection against ultraviolet light, such as in plastic film or light filters. The absorber can be incorporated into the mixture of monomers before polymerization to form the polymer or can be incorporated into the polymer at any point during its handling, as by milling into the polymer together with other compounding ingredients or during the spinning of polymers into fibers or other treatment thereof.

The indole-2-carboxylic acids produced by the process of this invention additionally find great utility as intermediates in the generation of the basic indole structure by decarboxylation of the carboxyl function in the 2-position by techniques well recognized in the art.

The following examples are provided to illustrate this invention but are not intended to be limiting upon the scope thereof.

EXAMPLE I

To 15 ml. of N,N-dimethylformamide was added 5.0 g. (0.0182 mole) of N-(p-toluenesulfonyl)-o-aminobenzaldehyde (prepared by the Rosenmund reduction of N-(p-toluenesulfonyl)-o-aminobenzoic acid). The solution was maintained at 0° C., and 0.45 g. (0.0187 mole) of sodium hydride was added and the resulting yellow solution stirred for about 10 minutes. The reaction mixture was then added dropwise to a solution of 20 g. of methyl bromoacetate in 5 ml. N,N-dimethylformamide at room temperature. The mixture was stirred for about 15 minutes; ice and ethyl ether were then added, and white crystals formed. The crystals were filtered, and the aqueous filtrate was extracted with ethyl ether. The ether extract was then evaporated to produce a residue of white solid. The white crystals and the white solid from the ether extract were combined and recrystallized from methanol containing 10 percent aqueous HCl to give 5.35 g. (86 percent) of N-(p-toluenesulfonyl) - N - methoxycarbonylmethyl - o-aminobenzaldehyde. Melting point 115–6° C.

Analysis.—Calculated for $C_{17}H_{17}NO_5S$: C, 58.78; H, 4.93; N, 4.03; O, 23.03. Found: C, 58.49, H, 4.69; N, 4.23; O, 23.31.

The above N,N-disubstituted sulfonamide (10 g.; 0.0288 mole) was stirred for 15 minutes in 300 ml. of methanol containing 1.57 g. (0.0288 mole) of sodium methoxide. The methanol was then evaporated, and ice water was added to the residue. The aqueous mixture was then extracted with chloroform, and the chloroform extract was dried over magnesium sulfate, filtered, and evaporated. The yellow residue was dissolved in 75 ml. of benzene, chilled to 0° C., and 4.5 g. (0.0576 mole) of pyridine and 3.43 g. (0.0288 mole) of thionyl chloride were added. The mixture was heated on a steam bath for about 30 minutes to accomplish dehydration. The benzene was then evaporated, and the residue was dissolved in ether, the ether solution was washed with dilute aqueous HCl followed by aqueous sodium bicarbonate. The ether solution was then dried over magnesium sulfate and evaporated to produce 9.0 g. (95 percent) of 1-p-toluenesulfonyl-indole-2-carboxylic acid, methyl ester, as a green oil which crystallized slowly on standing. Melting point 83–4° C.

Analysis.—Calculated for $C_{17}H_{15}NO_4S$: C, 61.99; H, 4.59; N, 4.25. Found: C, 61.69; H, 4.60; N, 4.42.

The above indole ester (1.50 g.) was refluxed for about 20 hours in 50 ml. of methanol containing 3.0 g. of sodium methoxide. The methanol was then evaporated, water was added, and the aqueous mixture was washed with ether. The aqueous mixture was then acidified by addition of HCl, and the acidified mixture was then extracted with ethyl ether. The ethyl ether extract was dried and evaporated to produce a residue which was recrystallized from a mixture of ethyl ether and hexane to give 660 mg. (90 percent) of indole - 2 - carboxylic acid. Melting point 205° C.

Analysis.—Calculated for $C_9H_7NO_2$: C, 67.08; H, 4.38; N, 8.69. Found: C, 66.82; H, 4.51; N, 8.69.

U.V. absorption in ethanol: 220 m$\mu$ ($\epsilon$ 11,000); 292 m$\mu$ ($\epsilon$ 8,600).

EXAMPLE II

A mixture containing 304 g. (1.6 moles) of p-toluenesulfonyl chloride, 200 g. (1.48 moles) of o-aminoacetophenone, and 138 g. (1.75 moles) of pyridine in 600 ml. of toluene was heated on a steam bath for about 12 hours. The reaction mixture was poured into water, and crystalline material was filtered. The organic layer of the filtrate was washed with HCl, dried, and evaporated to give oily crystals. The two crystalline materials were combined and recrystallized from methanol to give 350 g. (82 percent) of N-(p-toluenesulfonyl) - o - aminoacetophenone. Melting point 149° C.

The N-tosylated o-aminoacetophenone (25 g., 0.0865 mole) dissolved in 75 ml. of N,N-dimethylformamide was stirred at 0° C. with sodium hydride for 15 minutes. The N,N-dimethylformamide solution of the thus prepared amide anion was then added dropwise to 100 g. of methyl bromoacetate in 25 ml. of N,N-dimethylformamide at room temperature. Upon completion of the addition, the mixture was stirred for one hour and then poured over ice. The aqueous mixture was extracted with ethyl ether, and the ether extract was dried, filtered, and evaporated to give as a clear, pale yellow oil N-(p-toluenesulfonyl)-N-methoxycarbonylmethyl - o - aminoacetophenone. Recrystallization from methanol to give approximately 90% yield of crystals, melting point 90–1° C.

Analysis.—Calculated for $C_{18}H_{19}NO_5S$: C, 59.82; H, 5.30; N, 3.88; O, 22.13. Found: C, 59.81; H, 5.32; N, 4.05; O, 22.33.

The N,N-disubstituted sulfonamide (10 g., 0.0277 mole) was stirred at room temperature for one hour in 400 ml. of methanol containing 1.5 g. (0.0277 mole) of sodium methoxide. The methanol was then evaporated, and the residue was dissolved in water and chloroform. The chloroform layer was separated from the aqueous layer, dried over magnesium sulfate, and evaporated. The residue was then dissolved in 75 ml. of benzene, and at 0° C., 4.67 g. (0.058 mole) of pyridine was added followed by 3.27 g. (0.0277 mole) of thionyl chloride. A precipitate formed. The mixture was stirred for about one hour, and ether and ice were added. The organic layer was then separated, washed with water, dried and evaporated to produce 8.4 g. (89 percent) of tan crystals. Recrystallization from methanol gave 7.4 g. of 1-(p-toluenesulfonyl) - 2 - methoxycarbonyl - 3 - methylindole. Melting point 114–5° C.

Analysis.—Calculated for $C_{18}H_{17}NO_4S$: C, 62.96; H, 4.99; N, 4.08; O, 18.64. Found: C, 62.78; H, 5.18; N, 4.01; O, 18.64.

The above indole (2.0 g.; 5.85 millimoles) was refluxed with 20 ml. of 1 N sodium hydroxide in 80 ml. of methanol for 6 hours. The methanol was then evaporated, and the residue was dissolved in water, and washed with ether. The aqueous base was acidified by addition of concentrated HCl at 0° C. The product was then extracted into chloroform which, upon evaporation, gave 1.0 g. of crude product. The product was recrystallized from a mixture of benzene and petroleum ether and vacuum dried to give 0.87 g. (85 percent) of 3-methylindole-2-carboxylic acid. Melting point 164° C.

Analysis.—Calculated for $C_{10}H_9NO_2$: C, 68.56; H, 5.18; N, 8.00. Found: C, 69.06; H, 5.36; N, 7.76.

U.V. absorption in ethanol: 228 m$\mu$ ($\epsilon$ 24,000): 294 m$\mu$ ($\epsilon$ 16,000).

EXAMPLE III

To 500 ml. of benzene were added 50 g. (0.254 mole) of o-aminobenzophenone, 48.5 g. (0.254 mole) of p-toluenesulfonyl chloride, and 20 g. of pyridine. The solution was refluxed for about 3 hours and then cooled to room temperature. Water and ethyl ether were added, and the organic layer was separated, washed with water, and dried over magnesium sulfate. Evaporation of the ether gave a yellow oil which crystallized on cooling. Recrystallization from methanol provided 69 g. (78 percent) of N - (p - toluenesulfonyl) - o - aminobenzophenone. Melting point 126–7° C.

To 50 ml. of N,N-dimethylformamide were added 40 g. (0.11 mole) of the above-prepared sulfonamide and 38 g. (0.25 mole) of methyl bromoacetate. The mixture was chilled to 0° C. and 3.0 g. (0.13 mole) of sodium hydride was added in portions. After some effervescence, the mixture was heated at 50° C. for about 4 hours. The N,N-dimethylformamide was then evaporated, and water was added to the residue. The aqueous mixture was then extracted with ethyl acetate, and the ethyl acetate extract was washed with water, dried over magnesium sulfate, filtered, and evaporated. Recrystallization of the residue from methanol gave 39 g. of N-(p-toluenesulfonyl)-N-methoxycarbonylmethyl - o - aminobenzophenone. Melting point 126–7° C.

Analysis.—Calculated for $C_{23}H_{21}NO_5S$: C, 65.23; H, 5.00; N, 3.31. Found: C, 65.27; H, 4.98; N, 3.54.

To 50 ml. of dry N,N-dimethylformamide was added 10.0 g. (0.0236 mole) of the above ester. The mixture was treated at 0° C. by addition of 0.90 g. (0.037 mole) of sodium hydride in small portions. The resulting mixture was then stirred for about 30 minutes during which time the dark brown solution turned yellow. The reaction mixture was then poured into 500 ml. of a pH 7.0 buffer. The resulting buffered mixture was then extracted into 500 ml. of benzene. The benzene extract was dried over magnesium sulfate, 0.25 g. of p-toluenesulfonic acid was added, and the mixture refluxed overnight. The benzene mixture was evaporated to a red oil which was chromatographed on a 1.5 x 10 inch silica column to provide about 3 g. of 1-(p-toluenesulfonyl)-2-methoxycarbonyl-3-phenylindole. Melting point 93° C.

Analysis.—Calculated for $C_{23}H_{19}NO_4S$: C, 68.13; H, 4.72; N, 3.45; O, 15.78. Found: C, 67.92; H, 4.80. N, 3.69; O, 15.89.

To 20 ml. of methanol were added 500 mg. (1.23 mEq.) of the above indole ester and 5 ml. (5 mEq.) of 1 N sodium hydroxide. The mixture was refluxed on a steam bath for about 30 minutes. The methanol was then evaporated, water was added, and the aqueous mixture was washed with chloroform and then acidified by addition of 1 N HCl. The acidified mixture was then extracted with chloroform; the chloroform extract was dried over magnesium sulfate and evaporated to give 280 mg. (96 percent) of 3-phenylindole-2-carboxylic acid. Melting point 186° C.

Analysis.—Calculated for $C_{15}H_{11}NO_2$: C, 75.94; H, 4.67; N, 5.90; O, 13.49. Found: C, 75.81; H, 4.71; N, 5.75; O, 13.21.

U.V. absorption in ethanol: 238 m$\mu$ ($\epsilon$ 26,200); 297 m$\mu$ ($\epsilon$ 13,500).

EXAMPLE IV

To 50 ml. of N,N - dimethylformamide was added 25 g. (0.07 mole) of N-(p-toluenesulfonyl)-o-aminobenzophenone (prepared as in Example III). The resulting mixture was maintained at 0° C., and 1.75 g. (0.07 mole) of sodium hydride was added in small portions. The mixture was stirred for about 10 minutes, and 11.0 g. (0.08 mole) of bromoacetone was added. The mixture was then stirred for about one hour at room temperature. The N,N-dimethylformamide was evaporated using a rotor evaporator, and ice and water were added to the residue. The aqueous mixture was then extracted with ethyl ether. The ether extract was washed with water, dried over magnesium sulfate, filtered, and evaporated to provide a solid residue which was recrystallized from methanol to give 23.5 g. (86 percent) of N-(p-toluenesulfonyl)-N-acetylmethyl-o-aminobenzophenone. Melting point 109–110° C.

Analysis.—Calculated for $C_{23}H_{21}NO_4S$: C, 67.79; H, 5.19; N, 3.44; O, 15.70. Found: C, 67.56; H, 5.05; N, 3.07; O, 15.84.

The above N,N-disubstituted sulfonamide (10 g.; 0.02 mole), dissolved in 400 ml. of methanol, was stirred with 1.29 g. (0.02 mole) of sodium methoxide at room temperature for about one hour. The methanol was then evaporated, water and ice were added, and the aqueous mixture was extracted with chloroform. The chloroform extract was dried over potassium carbonate, and evaporated to an oil. The oil was dissolved in 75 ml. of benzene, and 3.8 ml. (0.05 mole) of pyridine was added followed by 2.78 g. (0.02 mole) of thionyl chloride at 0° C. The mixture was stirred for about 15 minutes, and ice and water were added. The benzene layer was separated from the aqueous layer and washed with aqueous sodium chloride solution. The benzene solution was dried and evaporated to a brown oil. The oil was then extracted with warm hexane, and the hexane extract was evaporated and triturated with methanol to give 7.6 g. (80 percent) of 1-(p-toluenesulfonyl)-2-acetyl - 3 - phenylindole. Melting point 75–7° C.

Analysis.—Calculated for $C_{23}H_{19}NO_3S$: C, 70.93; H, 4.92; N, 3.60; O, 12.32. Found: C, 70.12; H, 5.25; N, 3.56; O, 13.03.

The above N-sulfonyl indole (1.0 g.; 2.57 millimoles) was dissolved in 10 ml. of methanol containing 5 ml. of 1 N sodium hydroxide. The mixture was refluxed for about 2 hours. The methanol was then evaporated, and water and sodium chloride were added. Crystals formed which were collected by filtration, washed with water, and dried to give 553 mg. (92 percent) of 2-acetyl-3-phenylindole. Melting point 151° C.

Analysis.—Calculated for $C_{16}H_{13}NO$: C, 81.68; H, 5.57; N, 5.95. Found: C, 81.55; H, 5.78; N, 5.99.

U.V. absorption in ethanol: 243 m$\mu$ ($\epsilon$ 18,200); 311 m$\mu$ ($\epsilon$ 20,000).

EXAMPLE V

To 50 ml. of N,N-dimethylformamide was added 25 g. (0.07 mole) of N-(p-toluenesulfonyl)-o-aminobenzophenone (prepared as in Example III). To the mixture maintained at 0° C. was added 1.75 g. (0.07 mole) of sodium hydride in small portions. The mixture was stirred for about 10 minutes, and 16.0 g. (0.08 mole) of phenacyl bromide was added and stirring continued for about one hour at room temperature. Ice and water were added to the mixture and white crystals formed which were collected by filtration. The crystals were boiled with methanol, cooled and filtered to give 32 g. (96 percent) of N-(p-toluenesulfonyl) - N-menzoylmethyl-o-aminobenzophenone. Melting point 159–60° C.

Analysis.—Calculated for $C_{28}H_{23}NO_4S$: C, 71.62; H, 4.94; N, 2.98. Found: C, 71.41; H, 5.19; N, 3.07.

To 400 ml. of methanol was added 10.0 g. (0.02 mole) of the above N,N-disubstituted sulfonamide followed by 1.9 g. (0.03 mole) of sodium methoxide. The mixture was stirred for about 2 hours. The methanol was then evaporated, and 200 ml. of water containing 20 ml. of 10 percent HCl was added. The mixture was made alkaline by addition of sodium bicarbonate solution, and the resulting alkaline mixture was extracted with chloroform. The chloroform extract was dried and evaporated to an oil. The oil was then dissolved in 75 ml. of benzene, and 5 ml. of pyridine was added followed by 4.7 g. (0.04 mole) of thionyl chloride. The mixture was maintained at 0° C. for about one hour. The solvents were evaporated, water was added, and the aqueous mixture was stirred and a crystalline product filtered therefrom. Recrystallization from acetone gave 8.31 g. (89 percent) of 1 (p-toluenesulfonyl)-2-benzoyl-3-phenylindole. Melting point 192–3° C.

Analysis.—Calculated for $C_{28}H_{21}NO_3S$: C, 74.48; H, 4.69; N, 3.10. Found: C, 74.27; H, 4.64; N, 3.23.

The above N-sulfonyl indole (2.0 g.; 4.43 millimoles) was dissolved in 50 ml. of methanol, and 10 ml. of 2 N sodium hydroxide was added. The mixture was refluxed on a steam bath for about 12 hours. The methanol was then evaporated, and water was added, and the crystals which formed were collected by filtration, washed with water, and dried to give 1.30 g. (98 percent) of 2-benzoyl-3-phenyl-indole. Melting point 203–4° C.

Analysis.—Calculated for $C_{21}H_{15}NO$: C, 84.82; H, 5.08; N, 4.71. Found: C, 85.03; H, 5.27; N, 4.98.

U.V. absorption in ethanol: 250 m$\mu$ ($\epsilon$ 8,000); 325 m$\mu$ ($\epsilon$ 6,000).

EXAMPLE VI

To 50 ml. of dry dioxane was added 25 g. (0.07 mole) of N - (p - toluenesulfonyl)-o-aminobenzophenone (prepared as in Example III). The mixture was maintained at 0° C., and 1.75 g. (0.07 mole) of sodium hydride was added in three portions. The mixture was stirred until effervescence ceased (about 10 minutes). To the resulting mixture was then added 18.25 g. (0.08 mole) of p-methoxyphenacyl bromide, and stirring was continued for about 2 hours during which time the temperature was permitted to rise from 0° C. to about room temperature. The reaction mixture was evaporated to near dryness, and water was added to the residue. The aqueous mixture was stirred until a crystalline material formed which was filtered and washed with water and methanol. The crystals were dried in vacuo, and recrystallized from a mixture of chloroform and methanol to give 32 g. (90 percent) of N-(p-toluenesulfonyl) - N - (p-methoxybenzoylmethyl)-o-aminobenzophenone. Melting point 199–200° C.

Analysis.—Calculated for $C_{29}H_{25}NO_5S$: C, 69.72; H, 5.04; N, 2.80; O, 16.01. Found: C, 68.58; H, 5.14; N, 3.11; O, 14.75.

The above N,N-disubstituted sulfonamide (25 g.; 0.05 mole) was mixed with 400 ml. of methanol containing 2.7 g. (0.05 mole) of sodium methoxide. The resulting mixture was stirred for about 3 hours. The solid was removed by filtration, washed with methanol, and dried to a residue of 24.5 g. The solid was then suspended in 100 ml. of benzene, and 11.8 g. (0.15 mole) of pyridine was added followed by the dropwise addition of 6.55 g. (0.05 mole) of thionyl chloride. The resulting mixture was stirred for about 30 minutes. Additional benzene was added, and the mixture was washed with 10 percent HCl followed by aqueous sodium bicarbonate, dried over magnesium sulfate, and evaporated to an oil which crystallized upon trituration with a mixture of methanol and ether to give 18.6 g. (76 percent) of 1-(p-toluenesulfonyl) - 2 - (p-methoxybenzoyl)-3-phenylindole. Melting point 156–7° C.

Analysis.—Calculated for $C_{29}H_{23}NO_4S$: C, 72.33; H, 4.81; N, 2.91. Found: C, 71.80; H, 4.81; N, 3.11.

A mixture of 15.0 g. (0.03 mole) of the above N-sulfonyl indole in 300 ml. of methanol and 75 ml. of 2 N sodium hydroxide was refluxed for 16 hours. The methanol was then evaporated, water was added, and a solid was collected, washed with water, and vacuum dried to give 9.5 g. (94 percent) of 2-(p-methoxybenzoyl)-3-phenylindole. Melting point 155–6° C.

Analysis.—Calculated for $C_{22}H_{17}NO_2$: C, 80.71; H, 5.23; N, 4.28; O, 9.77. Found: C, 80.43; H, 5.35; N, 4.44; O, 9.95.

U.V. absorption in ethanol: 255 m$\mu$ ($\epsilon$ 9,200); 327 m$\mu$ ($\epsilon$ 8,300).

EXAMPLE VII

To 200 ml. of benzene were added 45.5 g. (0.23 mole) of o-aminobenzophenone, 19.8 g. (0.25 mole) of pyridine, and 27.4 g. (0.24 mole) of methanesulfonyl chloride. The mixture was refluxed for 16 hours. Salts which formed were removed by filtration, and the filtrate was evaporated to dryness. The residue was then recrystallized from methanol to give 44 g. (70 percent) of N-methanesulfonyl-o-aminobenzophenone. Melting point 106–7° C.

Analysis.—Calculated for $C_{14}H_{13}NO_3S$: C, 61.07; H, 4.76; N, 5.09; O, 17.43. Found: C, 61.24; H, 4.75; N, 5.29; O, 17.66.

The above methanesulfonamide (20.0 g.; 0.07 mole) was suspended in 50 ml. of N,N-dimethylformamide, and, to the resulting mixture maintained at 0° C., 1.8 g. (0.07 mole) of sodium hydride was added in small portions. The mixture was stirred for about 10 minutes, and 18.5 g. (0.08 mole) of p-chlorophenacyl bromide was added. Stirring was continued for about one hour during which time the reaction mixture was permitted to warm to room temperature. The reaction mixture was poured into water, and an oil was obtained which was triturated with methanol and recrystallized therefrom to produce 23.5 g. (75 percent) of N - methanesulfonyl - N - (p-chlorobenzoylmethyl)-o-aminobenzophenone. Melting point 157–8° C.

Analysis.—Calculated for $C_{22}H_{18}ClNO_4S$: C, 61.75; H, 4.24; O, 14.96; N, 3.27. Found: C, 62.02; H, 4.26; O, 15.16; N, 3.52.

The above N,N-disubstituted sulfonamide (10.0 g.; 0.02 mole) was mixed with 300 ml. of methanol containing 1.35 g. (0.02 mole) of sodium methoxide. The resulting mixture was stirred for 4 hours. The methanol was then evaporated, and dilute aqueous HCl was added. The aqueous acid mixture was made alkaline by addition of sodium bicarbonate, and the alkaline solution was then extracted with chloroform. The chloroform extract was dried and evaporated to a residue. The residue was then dissolved in 75 ml. of benzene, and 3.95 g. (0.05 mole) of pyridine was added followed by 2.98 g. (0.025 mole) of thionyl chloride. The resulting mixture was maintained at 0° C. for about one hour. The solvents were then evaporated, and water was added to the residue. The mixture was stirred during which time a solid formed. The solid was filtered and recrystallized from methanol to give 6.1 g. (64 percent) of 1-methanesulfonyl-2-(p-chlorobenzoyl-3-phenylindole. Melting point 149–50° C.

Analysis.—Calculated for $C_{22}H_{16}ClNO_3S$: C, 64.47; H, 3.93; N, 3.42. Found: C, 65.27; H, 3.72; N, 4.22.

The above N - sulfonyl indole (2.0 g.; 4 millimoles) was placed in 100 ml. of methanol, and 10 ml. (10 millimoles) of 1 N sodium hydroxide was added. The mixture was refluxed for about 3 hours. The methanol was then evaporated, and water was added to the residue. A solid formed which was collected by filtration, washed with water, and dried to give 1.28 g. (79 percent) of 2-(p-chlorobenzoyl) - 3 - phenylindole. Melting point 179–180° C.

Analysis.—Calculated for $C_{15}H_{13}ClNO$: C, 76.02; H, 4.25; N, 4.22; Cl, 1968. Found: C, 75.99; H, 4.29; N, 4.43; Cl, 10.58.

U.V. absorption in ethanol: 252 m$\mu$ ($\epsilon$ 21,000); 330 m$\mu$ ($\epsilon$ 16,000).

EXAMPLE VIII

Employing the same method as described in Example VII, 20.0 g. (0.073 mole) of N-methanesulfonyl-o-aminobenzophenone was reacted with 17.0 g. (0.08 mole) of p-methoxyphenacyl bromide to give 26.0 g. (88 percent) of N-methylsulfonyl - N - (p - methylbenzoylmethyl)-o-aminobenzophenone. Melting point 135–6° C.

Analysis.—Calculated for $C_{23}H_{21}NO_4S$: C, 67.79; H, 5.19; N, 3.44; O, 15.70. Found: C, 68.02; H, 5.15; N, 3.68; O, 15.74.

Again, using the same procedure as described in Example VII, the above N,N-disubstiuted sulfonamide (10.0 g.; 0.02 mole) was converted to obtain 6.0 g. (63 percent) of 1 - methylsulfonyl - 2 - (p-methylbenzoyl)-3-phenylindole. Melting point 164–5° C.

Analysis.—Calculated for $C_{23}H_{19}NO_3S$: C, 70.93; H, 4.92; N, 3.60; O, 12.32. Found: C, 68.84; H, 4.98; N, 4.02; O, 11.04.

In accordance with the procedure described in Example VII, the above N,N-disubstituted sulfonamide (10.0 mEq.) was converted to 1.35 g. (84 percent) of 2-(p-methylbenzoyl)-3-phenylindole. Melting point 148–9° C.

Analysis.—Calculated for $C_{22}H_{17}NO$: C, 84.86; H, 5.50; N, 4.50; O, 5.14. Found: C, 84.84; H, 5.62; N, 4.80; O, 5.25.

U.V. absorption in ethanol: 252 m$\mu$ ($\epsilon$ 21,000); 325 m$\mu$ ($\epsilon$ 15,000).

I claim:
1. Process for the preperation of an indole of the formula

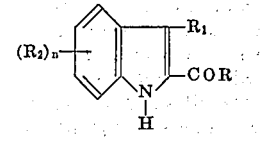

which comprises reacting an N-sulfonylated o-aminophenyl carbonyl compound of the formula

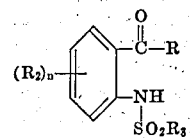

with at least an equimolar quantity of an $\alpha$-halo compound of the formula

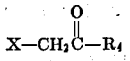

under substantially anhydrous conditions and in the presence of at least an equimolar amount of an alkaline reagent based upon the N-sulfonylated o-aminophenyl carbonyl compound to produce an N,N-disubstituted sulfonamide of the formula

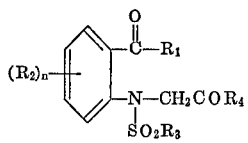

ring-closing in an alkaline medium and dehydrating the N,N-disubstituted sulfonamide to produce an N-sulfonyl indole of the formula

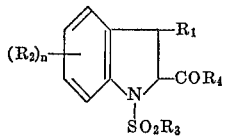

and cleaving the sulfonyl group to produce the aforementioned indole, in which, in the above formulae,
X is chlorine or bromine;
n is zero, 1 or 2;
$R_1$ is hydrogen, lower alkyl, phenyl, halophenyl, nitrophenyl, lower alkylphenyl, or lower alkoxyphenyl;
each $R_2$ independently is halogen, lower alkyl, lower alkoxy, nitro, or trifluoromethyl;
$R_3$ is lower alkyl, phenyl, or lower alkylphenyl;
$R_4$ is lower alkyl, phenyl, halophenyl, nitrophenyl, lower alkylphenyl, lower alkoxyphenyl, lower alkoxy, or phenoxy; and
R is lower alkyl, phenyl, halophenyl, nitrophenyl, lower alkylphenyl, lower alkoxyphenyl, or hydroxyl.

2. Process of claim 1, in which the N-sulfonylated o-amino carbonyl compound is reacted with the α-halo compound at a temperature of from about —10° C. to about +75° C.

3. Process of claim 2, in which the N-sulfonylated o-amino carbonyl compound is reacted with the α-halo compound in the presence of an alkali metal hydride.

4. Process of claim 3, in which the alkali metal hydride is sodium hydride.

5. Process of claim 1, in which ring-closure of the N,N-disubstituted sulfonamide is carried out in the presence of an alkali metal alkoxide.

6. Process of claim 5, in which dehydration of the ring-closed carbinol intermediate is effected in the presence of thionyl chloride and a tertiary amine.

7. Process of claim 1, in which $R_4$ of the N-sulfonyl indole is lower alkoxy or phenoxy, at least two equivalents of an alkaline reagent are employed per mole of the N-sulfonyl indole, and the indole product is an indole-2-carboxylic acid.

8. Process of claim 1, in which $R_4$ of the N-sulfonyl indole is lower alkyl, phenyl, halophenyl, nitrophenyl, lower alkylphenyl, or lower alkoxyphenyl, at least one equivalent of an alkaline reagent is employed per mole of the N-sulfonyl indole, and the indole product is a 2-acyl indole.

References Cited
UNITED STATES PATENTS 3,660,430    5/1972    Freed et al. _____ 260—326.16

OTHER REFERENCES

Oklobdzija et al.: *J. Het. Chem.* 9: 161-3 (February 1972).

Sundberg: *The Chemistry of Indoles*, pp. 419–420 (1970), Academic Press.

JOSEPH A. NARCAVAGE, Primary Examiner

U.S. Cl. X.R.

260—326.12 R, 556 A, 470, 556 AR

UNITED STATES PATENT OFFICE
CERTIFICATE OF CORRECTION

Patent No. 3,838,167        Dated September 24, 1974

Inventor(s) Charles D. Jones

It is certified that error appears in the above-identified patent and that said Letters Patent are hereby corrected as shown below:

Column 10, line 22, "N-menzoylmethyl" should read -- N-benzoylmethyl --.

Column 12, line 7, "chlorobenzoyl" should read --chlorobenzoyl)--.

Column 12, line 20, "1968" should read --10.68--.

Column 12, line 43, delete "N,N-disubstituted sulfonamide (10.0" and insert -- N-sulfonyl indole (2.0 g.; 5.15 --.

Column 12, line 52, "preperation" should read --preparation--.

Column 12, line 64, in the second formula of Claim 1, "R" should read --$R_1$--.

Signed and sealed this 18th day of March 1975.

(SEAL)
Attest:

RUTH C. MASON
Attesting Officer

C. MARSHALL DANN
Commissioner of Patents
and Trademarks